Jan. 29, 1957  D. VAN DONGEN  2,779,589
VERTICALLY SWINGING CLOSURE OPERATOR
Filed Jan. 9, 1956

# United States Patent Office 2,779,589
Patented Jan. 29, 1957

2,779,589

VERTICALLY SWINGING CLOSURE OPERATOR

Dingeman van Dongen, Haarlem, Netherlands, assignor to N. V. Bronswerk, Amersfoort, Netherlands, a corporation of the Netherlands Application January 9, 1956, Serial No. 558,125

Claims priority, application Netherlands January 11, 1955

8 Claims. (Cl. 268—75)

This invention relates to a device for closing an opening in the wall of a passage by means of a driven closing device rotatable over 180° of which the axis of rotation is located in a recess-like protrusion of this passage in such a manner that in its open position the closing device is situated with its side remote from the inner wall of said protrusion flush with the inner wall of the passage in which this protrusion is provided.

If the channel consists for example of a passage in a building or ship and the opening provided in the wall is a door opening, the closing device being a fire door adapted to close the said door opening, devices of this kind always present the disadvantage that the side wall of the recess-like protrusion facing the door opening to be closed has to remain unprotected when the fire door is in the open position so that from that side the interior of the recess with the fire door driving mechanism provided therein always remains visible which is undesirable from an esthetic point of view.

This objection is met by the present invention as it is characterized in that the driving mechanism for the closing device comprises at least one non-rotatable gear wheel arranged co-axially with the axis of rotation of the said closing device, a gear rack slidably arranged in the closing device being in engagement with the said gear wheel, and that at the vertical side of the said closing device situated near the side of the axis of rotation of this closing device a closing wall is provided extending vertically to the main plane of the closing device and of such length that in the open position of the closing device this closing wall entirely closes the side of the recess and, when the closing device is being closed, the said closing wall may freely move around the axis of rotation through the recess-like protrusion.

The above-mentioned driving mechanism for the closing device is known per se from the U. S. patent specification 1,989,908.

The invention will be described below with reference to the accompanying drawings showing by way of example an embodiment of this invention.

Figures 1, 2:
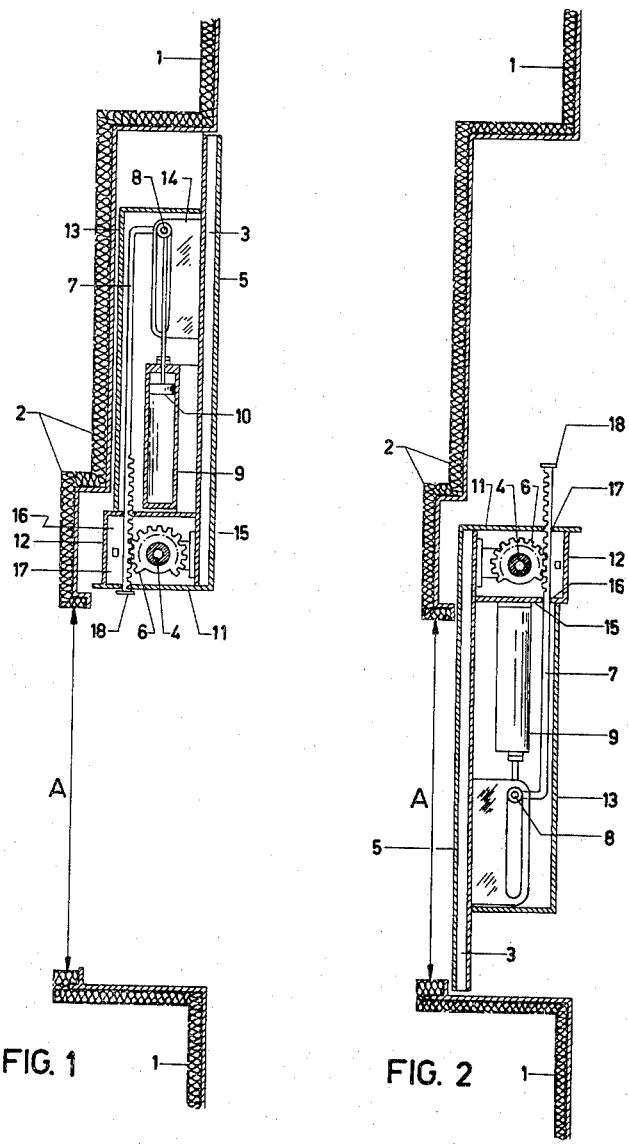
Fig. 1 is a horizontal section through the device according to the invention, the closing device being in its completely open position.
Fig. 2 is a similar section, the closing device, however, being in its closed position which differs from the open position by 180°.

In both figures reference number 1 indicates a wall of a passage in which an opening has been provided at A which may be closed by a closing device 3 rotatable over 180°. In this wall 1 a recess-like protrusion 2 is provided in which a rotation axis 4 for the closing device 3 is arranged in such a manner that in the open position of the closing device (Fig. 1) an outer surface 5 of the said closing device is flush with the passage wall 1.

On the stationary axis of rotation 4 of the closing device a gear wheel 6 is fixedly mounted in such a manner that this gear wheel is unable to rotate. This gear wheel is in engagement with a gear rack 7 which is secured at 8 to a piston rod of a piston 10 adapted to effect a reciprocating movement in a cylinder 9. If in the position of the device shown in Fig. 1 a pressure medium is admitted to the right of the piston 10, this piston will endeavour to move to the left in the drawing, which is only possible if the gear rack 7 rolls around the immovable gear wheel 6 so that consequently the closing device 3 with all parts connected thereto starts rotating until finally the closed position shown in Fig. 2 is reached.

Due to the fact that the above-mentioned construction does not comprise any parts forming a connection between the walls of the recess-like protrusion 2 and the wall 1 of the passage, it is possible to enclose the entire driving mechanism of the closing device 3 by walls 11, 12, 13 and 14. The result is that in the open position of the closing device (Fig. 1) the recess-like protrusion 2 is closed by the wall 11 also at its side facing the opening A. This is of great importance since as a consequence thereof the opening A is kept as smooth as possible and no unnecessary resistance occurs when a medium flows through this opening. If on the other hand the closing device 3 comprises a fire door which is supposed to close an opening in a passage, then, as stated above, it is also very desirable for esthetical reasons to hide the recess with the mechanism therein from view. Moreover, the above construction according to the invention offers the possibility of incorporating the entire driving mechanism of the door into the door itself so that it is completely protected against the influences of dirt, contact by unauthorized persons and particularly of a possible fire since it may be entirely isolated.

In the device according to the invention an opening 17 should be provided in the wall 11 for allowing the gear rack 7 to pass through and an opening 16 in an intermediate wall 15 to be constructed if required. The length of the gear rack is so chosen that in the open position of the door (Fig. 1) the free end of the gear rack substantially coincides with the outer surface of the wall 11 so that in this open position the gear rack is entirely hidden from view. Moreover, in order to improve the esthetical effect of the door still further, a small plate 18 may be fixed on the free end of the gear rack, this small plate completely camouflaging the opening 17 in the wall 11 if the door is in the open position.

I claim:

1. A device for closing an opening in the wall of a passage by means of a driven closing device rotatable over 180° of which the axis of rotation is located in a recess-like protrusion of this passage in such a manner that in its open position the closing device is situated with its side remote from the inner wall of said protrusion flush with the inner wall of the passage in which this protrusion is provided, characterized in that the driving mechanism for the closing device comprises at least one non-rotatable gear wheel arranged co-axially with the axis of rotation of the said closing device, a gear rack slidably arranged in the closing device being in engagement with the said gear wheel, and that at the vertical side of the said closing device situated near the side of the axis of rotation of this closing device a closing wall is provided extending vertically to the main plane of the closing device and of such length that in the open position of the closing device this closing wall entirely closes the side of the recess and, when the closing device is being closed, the said closing wall may freely move around the axis of rotation through the said protrusion.

2. A device according to claim 1, characterized in that in the closing wall an opening is provided allowing the gear rack pass through.

3. A device for closing an opening in the wall of a passage by means of a driven closing device rotatable over 180° of which the axis of rotation is located in a recess-like protrusion of this passage in such a manner that in its open position the closing device is situated with its side remote from the inner wall of said protrusion flush with the inner wall of the passage in which this protrusion is provided, characterized in that the driving mechanism for the closing device comprises at least one non-rotatable gear wheel arranged co-axially with the axis of rotation of the said closing device, a gear rack slidably arranged in the closing device being in engagement with the said gear wheel, and that at the vertical side of the said closing device situated near the side of the axis of rotation of this closing device a closing wall is provided extending vertically to the main plane of the closing device and of such length that in the open position of the closing device this closing wall entirely closes the side of the recess and, when the closing device is being closed, the said closing wall may freely move around the axis of rotation through the said protrusion and that in the closing wall an opening is provided allowing the gear rack to pass through it.

4. A device according to claim 1, characterized in that in the closing wall an opening is provided allowing the gear rack pass through and that of the closing device the end surface of this gear rack substantially coincides with the outer surface of the closing wall.

5. A device for closing an opening in the wall of a passage by means of a driven closing device rotatable over 180° of which the axis of rotation is located in a recess-like protrusion of this passage in such a manner that in its open position the closing device is situated with its side remote from the inner wall of said protrusion flush with the inner wall of the passage in which this protrusion is provided, characterized in that the driving mechanism for the closing device comprises at least one non-rotatable gear wheel arranged co-axially with the axis of rotation of the said closing device, a gear rack slidably arranged in the closing device being in engagement with the said gear wheel, and that at the vertical side of the said closing device situated near the side of the axis of rotation of this closing device a closing wall is provided extending vertically to the main plane of the closing device and of such length that in the open position of the closing device this closing wall entirely closes the side of the recess and, when the closing device is being closed, the said closing wall may freely move around the axis of rotation through the said protrusion and that in the closing wall an opening is provided allowing the gear rack to pass through it and that of the closing device the end surface of this gear rack substantially coincides with the outer surface of the closing wall.

6. A device for closing an opening in the wall of a passage by means of a driven closing device rotatable over 180° of which the axis of rotation is located in a recess-like protrusion of this passage in such a manner that in its open position the closing device is situated with its side remote from the inner wall of said protrusion flush with the inner wall of the passage in which this protrusion is provided, characterized in that the driving mechanism for the closing device comprises at least one non-rotatable gear wheel arranged co-axially with the axis of rotation of the said closing device, a gear rack slidably arranged in the closing device being in engagement with the said gear wheel, and that at the vertical side of the said closing device situated near the side of the axis of rotation of this closing device a closing wall is provided extending vertically to the main plane of the closing device and of such length that in the open position of the closing device this closing wall entirely closes the side of the recess and, when the closing device is being closed, the said closing wall may freely move around the axis of rotation through the said protrusion and that in the closing wall an opening is provided allowing the gear rack to pass through it and that a plate is arranged on the end surface of the gear rack, this plate completely closing the opening for the gear rack in the closing wall when the gear rack is withdrawn.

7. A device according to claim 1, characterized in that in the closing wall an opening is provided allowing the gear rack pass through and that of the closing device the end surface of this gear rack substantially coincides with the outer surface of the closing wall and that a plate is arranged on the end surface of the gear rack, this plate completely closing the opening for the gear rack in the closing wall when the gear rack is withdrawn.

8. A device for closing an opening in the wall of a passage by means of a driven closing device rotatable over 180° of which the axis of rotation is located in a recess-like protrusion of this passage in such a manner that in its open position the closing device is situated with its side remote from the inner wall of said protrusion flush with the inner wall of the passage in which this protrusion is provided, characterized in that the driving mechanism for the closing device comprises at least one non-rotatable gear wheel arranged co-axially with the axis of rotation of the said closing device, a gear rack slidably arranged in the closing device being in engagement with the said gear wheel, and that at the vertical side of the said closing device situated near the side of the axis of rotation of this closing device a closing wall is provided extending vertically to the main plane of the closing device and of such length that in the open position of the closing device this closing wall entirely closes the side of the recess and, when the closing device is being closed, the said closing wall may freely move around the axis of rotation through the said protrusion and that in the closing wall an opening is provided allowing the gear rack to pass through it and that of the closing device the end surface of this gear rack substantially coincides with the outer surface of the closing wall and that a plate is arranged on the end surface of the gear rack, this plate completely closing the opening for the gear rack in the closing wall when the gear rack is withdrawn.

No references cited.